(12) United States Patent
Ye

(10) Patent No.: US 12,328,403 B2
(45) Date of Patent: Jun. 10, 2025

(54) FULL-SCREEN ELECTRONIC DEVICE

(71) Applicant: VIVO MOBILE COMMUNICATION CO., LTD., Guangdong (CN)

(72) Inventor: Jian Ye, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 336 days.

(21) Appl. No.: 17/888,627

(22) Filed: Aug. 16, 2022

(65) Prior Publication Data
US 2022/0394118 A1    Dec. 8, 2022

Related U.S. Application Data

(63) Continuation of application No. PCT/CN2021/077612, filed on Feb. 24, 2021.

(30) Foreign Application Priority Data

Mar. 3, 2020  (CN) .......................... 202010139122.4

(51) Int. Cl.
*H04M 1/02*    (2006.01)
(52) U.S. Cl.
CPC ....... *H04M 1/0214* (2013.01); *H04M 1/0268* (2013.01)
(58) Field of Classification Search
None
See application file for complete search history.

(56) References Cited

U.S. PATENT DOCUMENTS

| | | | |
|---|---|---|---|
| 2014/0118317 A1 | 5/2014 | Song et al. | |
| 2014/0211399 A1 | 7/2014 | O'Brien | |
| 2019/0302847 A1 | 10/2019 | Chen et al. | |
| 2020/0133422 A1* | 4/2020 | Maalouf | G06F 3/14 |

FOREIGN PATENT DOCUMENTS

| | | |
|---|---|---|
| CN | 207968585 U | 10/2018 |
| CN | 208956111 U | 6/2019 |
| CN | 110035153 A | 7/2019 |
| CN | 110266844 A | 9/2019 |
| CN | 209358589 U | 9/2019 |
| CN | 110300195 A | 10/2019 |
| CN | 110362155 A | 10/2019 |
| CN | 111314516 A | 6/2020 |

OTHER PUBLICATIONS

English Translation of CN110300195, Wu Tingqiang, Green Lantern Labs Shenzhen Tech. Co, Lts (Year: 2019).*

* cited by examiner

*Primary Examiner* — Suhail Khan
(74) *Attorney, Agent, or Firm* — Price Heneveld LLP

(57) ABSTRACT

An electronic device is provided. The electronic device includes a housing, a screen module, a functional module, and a control mechanism. The functional module and the control mechanism are located in an accommodating space formed by the housing and the screen module. The screen module includes a first screen and a foldable second screen, and the control mechanism is connected to the second screen and drives the second screen to switch between a folded state and an unfolded state. In a case that the second screen is in the unfolded state, the second screen blocks the functional module. In a case that the second screen is in the folded state, the functional module is exposed from the accommodating space.

8 Claims, 9 Drawing Sheets

FULL-SCREEN ELECTRONIC DEVICE

CROSS-REFERENCE TO RELATED APPLICATIONS

This application is continuation application of PCT International Application No. PCT/CN2021/077612 filed on Feb. 24, 2021, which claims priority to Chinese Patent Application No. 202010139122.4, filed in China on Mar. 3, 2020, which are incorporated herein by reference in their entireties.

TECHNICAL FIELD

Embodiments of the present disclosure relate to the field of communications technologies, and in particular, to an electronic device.

BACKGROUND

With development of the mobile phone industry, mobile phones continue to pursue ultimate appearances, and a screen-to-body ratio of a mobile phone screen is also increasingly higher. Especially, after the second half of 2017, how to further increase the screen-to-body ratio of the mobile phone screen becomes a highlight of competition among major mobile phone manufacturers. Currently, screen types with large screen-to-body ratios include a notch screen, a water drop screen, a magic eye full screen, and the like. However, none of the screen types is implemented as a true full screen. This is because a most suitable position for mounting some functional components of a mobile phone is the front of the mobile phone, for example, a front-facing camera that needs to capture front images of the mobile phone. Therefore, how to further increase the screen-to-body ratio and implement a true "full screen" without affecting functions and usage effects of the mobile phone has become a growing challenge.

SUMMARY

The embodiments of the present disclosure provide an electronic device, including a housing, a screen module, a functional module, and a control mechanism, where
  the functional module and the control mechanism are located in an accommodating space formed by the housing and the screen module;
  the screen module includes a first screen and a foldable second screen, and the control mechanism is connected to the second screen and drives the second screen to switch between a folded state and an unfolded state; and
  in a case that the second screen is in the unfolded state, the second screen blocks the functional module; or in a case that the second screen is in the folded state, the functional module is exposed from the accommodating space.

DESCRIPTION OF EMBODIMENTS

Figure 1:
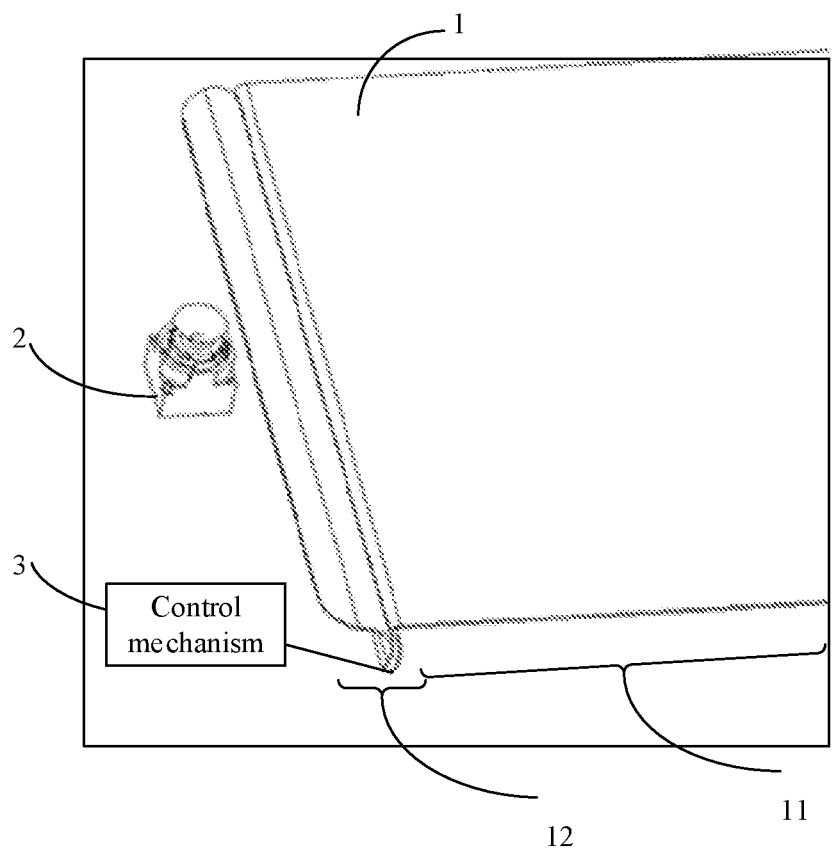
FIG. 1 is a first schematic structural diagram of an electronic device with a second screen in a folded state according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the described embodiments of the present disclosure shall fall within the protection scope of the present disclosure.

In the related art, to implement a higher screen-to-body ratio, there is a solution that uses a motor to drive a camera up and down. The camera is hidden under a screen when the camera is not in use, and extends out of a mobile phone when the camera is in use. Specifically, automatic extension and retraction of the camera can be implemented by using a driving motor, and some complex technical structures such as a screw mechanism and a sliding mechanism. A solution using a rotating motor to drive a front-facing camera to extend or a solution using a motor to drive a camera up and down usually has the following disadvantages: 1. Because an opening needs to be designed in a middle metal frame in a camera extending design to cooperate with a camera extending assembly, a gap exists and affects delicacy of the appearance, and finally affects aesthetics of the appearance. 2. Because the opening is designed in the middle metal frame to cooperate with the camera extending assembly, liquids such as water vapor and sweat easily enter the gap, causing corrosion of internal components and a mainboard of the mobile phone. 3. Because the opening is designed in the middle metal frame to cooperate with the camera extending assembly, dust and other foreign objects easily enter the gap. Consequently, the camera cannot effectively extend, or the camera cannot extend smoothly, affecting use experience of consumers. 4. For moving up and down of the camera, the motor needs to rotate to drive the front-facing camera to extend. Because the motor starts and responds slowly, the front-facing camera extends slowly, and extension takes a relatively long time and needs to take several seconds. 5. Because components such as the motor, a transmission screw, and a spring are used to move the camera up and down, the components occupy a large space in the entire mobile phone. This is not conducive to a stacking layout of the entire mobile phone. 6. Because moving up and down of the camera are driven by the motor, if the camera is dropped when being extending, the extending camera cannot immediately retract into the mobile phone due to fast free-fall movement and reverse resistance of the motor and the screw. Consequently, the extending camera is unable to move up and down normally after being dropped and deformed. 7. Because moving up and down of the camera are driven by the motor, when the motor drives the screw to rotate, vibration and abnormal noise tend to be generated, not good for use experience of consumers. 8. Because the opening is designed in the middle metal frame, strength of an upper end of the middle metal frame is destroyed, and the drop of the entire mobile phone tends to cause a break in the upper screen. 9. Because the opening is designed in the middle metal frame, integrity of the upper end of the middle metal frame is destroyed, and this is not conducive to an antenna layout design using the middle metal frame as an antenna radiator. 10. Because the front-facing camera needs to extend when taking a picture, it is easy for nearby personnel to find that the consumer is taking a selfie, not good for privacy protection of consumers.

To avoid the disadvantages of the foregoing solution that uses the motor to drive the camera up and down to implement a true full screen, an embodiment of the present disclosure provides a solution based on a flexible full screen. For details, refer to the following description.

FIG. 1 is a schematic structural diagram of an electronic device according to an embodiment of the present disclosure. The electronic device includes a housing, a screen module 1, a functional module 2, and a control mechanism 3.

The functional module 2 and the control mechanism 3 are located in an accommodating space formed by the housing and the screen module 1.

The screen module 1 includes a first screen 11 and a foldable second screen 12. The control mechanism 3 is connected to the second screen 12 and drives the second screen 12 to switch between a folded state and an unfolded state.

In a case that the second screen 12 is in the unfolded state, the second screen 12 blocks the functional module 2; or in a case that the second screen 12 is in the folded state, the functional module 2 is exposed from the accommodating space.

For example, when receiving a first control instruction, the control mechanism 3 controls the second screen 12 to move in a direction approaching the first screen 11, so that the second screen 12 is in the folded state to expose the functional module 2; or when receiving a second control instruction, the control mechanism 3 controls the second screen 12 to move away from the first screen 11, so that the second screen 12 is in the unfolded state to block the functional module 2.

The functional module 2 may be a front-facing camera, a light sensor, a distance sensor, an earpiece, or the like, and can be fixed on a middle frame 6 of the electronic device. The middle frame 6 is generally made of a metal material, and therefore can also be referred to as a middle metal frame.

Specifically, when the functional module 2 is the front-facing camera, because the front-facing camera is located below the opaque screen module 1, when the screen module 1 is in the unfolded state, the front-facing camera cannot take a picture. When a user needs to take a picture, after tapping a front-shooting function, the user can control the second screen 12 that is on the screen module 1 and located above the front-facing camera to curl into the electronic device, and unblock a viewing angle of the front-facing camera, so that the front-shooting function can be implemented.

Optionally, the first screen 11 and the second screen 12 may be integrated screens in two different areas of the screen module 1.

In this embodiment of the present disclosure, by folding and unfolding a part of a screen above the functional module 2, that is, the second screen 12, a true full screen is implemented while implementation of a function of the functional module is ensured In addition, when the function of the functional module 2 is implemented, only a part of the screen that blocks the functional module 2, that is, the second screen 12, is folded, and the other part of the screen, that is, the first screen 11, can still be displayed normally.

Specifically, when the functional module 2 is the front-facing camera, by folding and unfolding the part of the screen above the front-facing camera, that is, the second screen 12, the true full screen is implemented while implementation of the front-shooting function is ensured. In addition, in comparison with a solution that uses a motor to drive a camera up and down, this embodiment of the present disclosure has the following advantages:

1. In comparison with a camera extending design in which an opening is required in a middle metal frame, this embodiment of the present disclosure avoids a gap that affects delicacy of the appearance, and integrity of a side wall is reserved, which helps improve aesthetics of the appearance of the side wall. 2. In comparison with the camera extending design in which the opening is required in the middle metal frame, this embodiment of the present disclosure does not have a problem that liquids such as water vapor and sweat can easily enter the gap, thereby reducing a risk of corrosion of internal components and a mainboard of a mobile phone. 3. In comparison with the camera extending design in which the opening is required in the middle metal frame, this embodiment of the present disclosure is free of pain points such as poor inability of the camera to extend or blocking of the camera from extending because dust and other foreign objects easily enter the gap. Therefore, switching by the consumer is natural. 4. In comparison with slow extension of a front-facing camera in the camera extending design, the front-facing camera in this embodiment of the present disclosure has a short switching time for taking pictures, and user experience is good. 5. In comparison with the camera extending design using components such as a motor, a transmission screw, and a spring that occupy a large space, in this embodiment of the present disclosure, a relatively small space of the entire mobile phone is occupied, good for a stacking layout of the entire mobile phone. 6. In comparison with the camera extending design in which there is a risk of camera failure when the front-facing camera is dropped after the camera extends, the functional module 2 in this embodiment of the present disclosure, such as the front-facing camera, is located in the entire mobile phone and is not easily damaged when dropped. 7. In comparison with the camera extending design in which vibration and abnormal sound are generated when the front-facing camera extends or retracts, in this embodiment of the present disclosure, it is not easy to generate abnormal sound, and this is conducive to consumer experience. 8. In comparison with the camera extending design in which the opening required in the middle metal frame destroys strength of an upper end of the middle metal frame, in this embodiment of the present disclosure, integrity of the middle frame is reserved, and the screen at the upper end is not easily broken when the entire mobile phone is dropped. 9. In comparison with the camera extending design in which the opening required in the middle metal frame destroys integrity of the upper end of the middle metal frame, in this embodiment of the present disclosure, the integrity of the middle frame is reserved, and this is conducive to an antenna layout design using the middle metal frame as an antenna radiator. 10. In comparison with the camera extending design, in this embodiment of the present disclosure, it is not easy for nearby personnel to find that the consumer is taking a selfie, good for privacy protection of consumers.

In addition, when taking a picture, the electronic device provided in this embodiment of the present disclosure folds only a part of a screen that blocks the front-facing camera, that is, the second screen 12, and the other part of the screen, that is, the first screen 11, can still be displayed normally, so that functions such as photo preview and filter adjustment can be implemented.

The following describes the electronic device by using an example.

Figure 2:
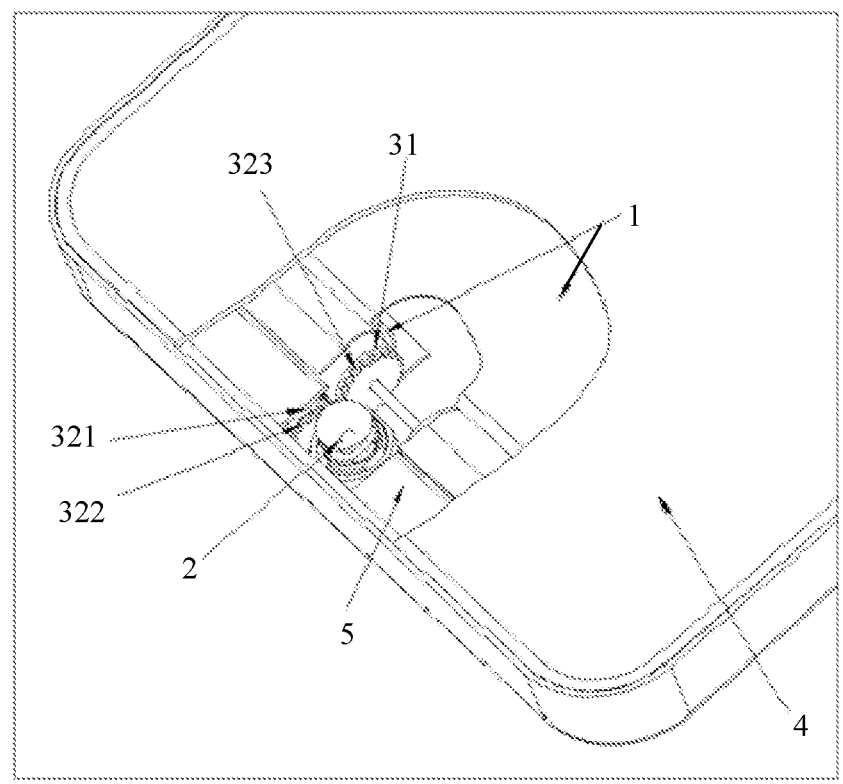
FIG. 2 is a second schematic structural diagram of an electronic device with a second screen in a folded state according to an embodiment of the present disclosure.
Figure 3:
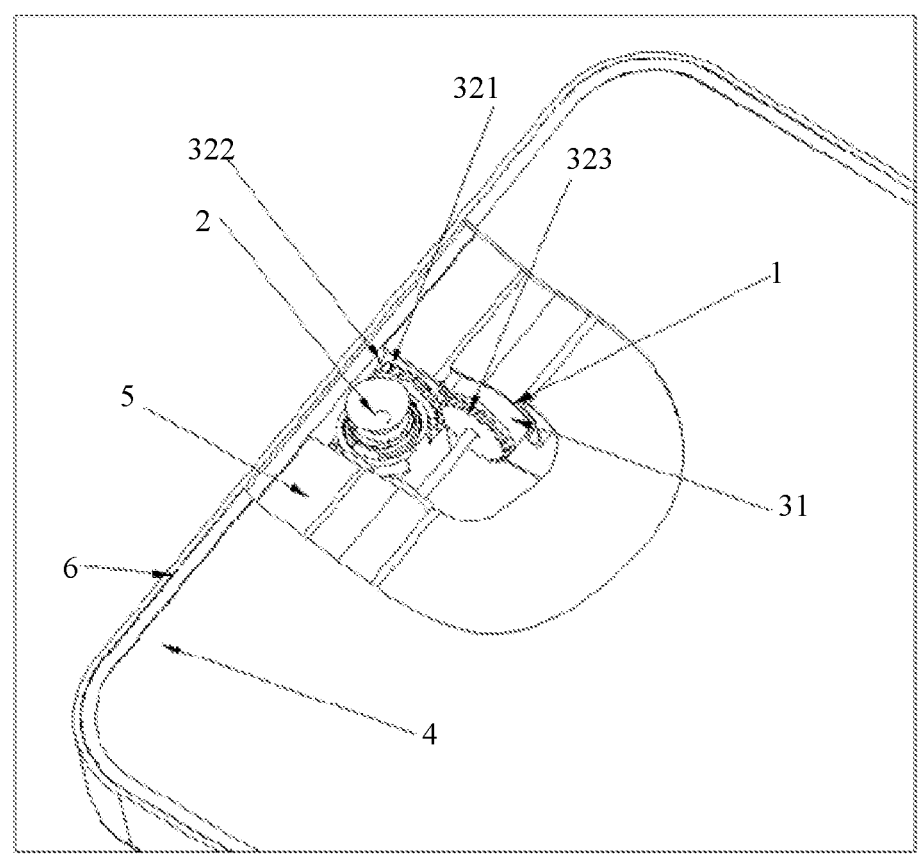
FIG. 3 is a third schematic structural diagram of an electronic device with a second screen in a folded state according to an embodiment of the present disclosure.

Optionally, referring to FIG. 2 and FIG. 3, the electronic device further includes a transparent cover 4 disposed above the screen module 1. Specifically, the transparent cover 4 may be a glass cover. The transparent cover 4 may also be referred to as a touchscreen (Touch Panel, TP) cover.

In this embodiment of the present disclosure, the transparent cover 4 can not only protect the functional module 2 and the screen module 1, but also protect other components inside the electronic device.

Further optionally, the first screen 11 is fixedly connected to the transparent cover 4.

In this embodiment of the present disclosure, by fixedly connecting the first screen 11 of the screen module 1, the entire screen module 1 can be fixed to prevent the screen module 1 from moving and folding in the transparent cover 4 and affecting a display effect.

The second screen 12 of the screen module 1 is not fastened to the transparent cover 4, and can be partially bent.

Figure 4:
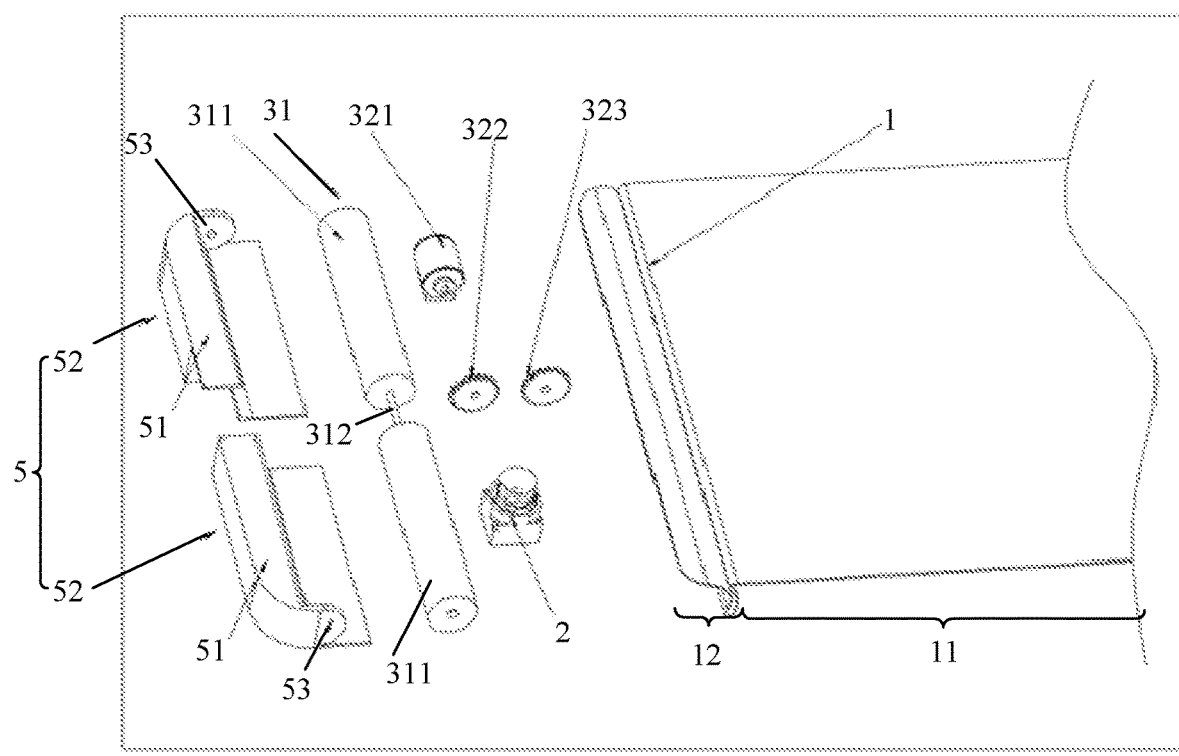
FIG. 4 is a schematic structural exploded view of an electronic device with a second screen in a folded state according to an embodiment of the present disclosure.

Optionally, referring to FIG. 2 to FIG. 4, the control mechanism 3 includes a supporting roller 31 and a roller driving mechanism.

The supporting roller 31 is fixedly connected to part of the second screen 12.

In a case that the roller driving mechanism drives the supporting roller 31 to rotate in a first direction, the supporting roller 31 drives the second screen 12 to move in a direction approaching the first screen 11, to fold the second screen 12; or in a case that the roller driving mechanism drives the supporting roller 31 to rotate in a second direction, the supporting roller 31 drives the second screen 12 to move in a direction leaving the first screen 11, to unfold the second screen 12.

Specifically, when the second screen 12 is in the unfolded state, the second screen 12 is located above the supporting roller 31 and is in contact with the supporting roller 31, and the contact part is fixedly connected, for example, bonded, to the supporting roller 31.

In this embodiment of the present disclosure, a space occupied by the supporting roller 31 is relatively small, and no additional space is required when the supporting roller 31 rotates, good for a stacking layout of the electronic device and a size design of the electronic device.

In other optional specific implementations, the control mechanism 3 may alternatively be in other forms, such as a telescopic mechanism or a screw driving mechanism.

Further optionally, referring to FIG. 2 to FIG. 4, the electronic device further includes a roller bracket 5, where the roller bracket 5 includes a supporting plate 51, the supporting plate 51 and the supporting roller 31 are arranged side by side, and when the second screen 12 is in the unfolded state, an edge of the second screen 12 away from the first screen 11 is flat on the supporting plate 51.

Specifically, an upper surface of the supporting plate 51 is flush with the supporting roller 31, so that the second screen 12 can be flat and not bent when the second screen 12 is in the unfolded state, to ensure a visual pleasure for the user.

The roller bracket 5 can be fixed on the electronic device.

Specifically, the supporting plate 51 can be disposed on an edge of the electronic device, and is adjacent to the frame. The supporting roller 31 is disposed between the supporting plate 51 and the first screen 11 at a predetermined distance from the first screen 11.

In this embodiment of the present disclosure, not only the roller bracket 5 can support and fix the supporting roller 31, but also the supporting plate 51 on the roller bracket 5 can support the second screen 12 when the second screen 12 is in the unfolded state. Therefore, the second screen 12 can be flatter, and the second screen 12 is prevented from being bent due to gravity or the like, which otherwise affects the display effect.

In other optional specific implementations, the roller bracket 5 may alternatively not include the supporting plate 51, and the supporting roller 31 is disposed on the edge of the electronic device and is adjacent to the frame.

Optionally, referring to FIG. 2 to FIG. 4, the roller driving mechanism includes a driving motor 321, a driving gear 322, and a driven gear 323.

The driving gear 322 is coaxially and fixedly connected to the driving motor 321.

The driven gear 323 meshes with the driving gear 322.

The driven gear 323 is coaxially and fixedly connected to the supporting roller 31.

Figure 5:
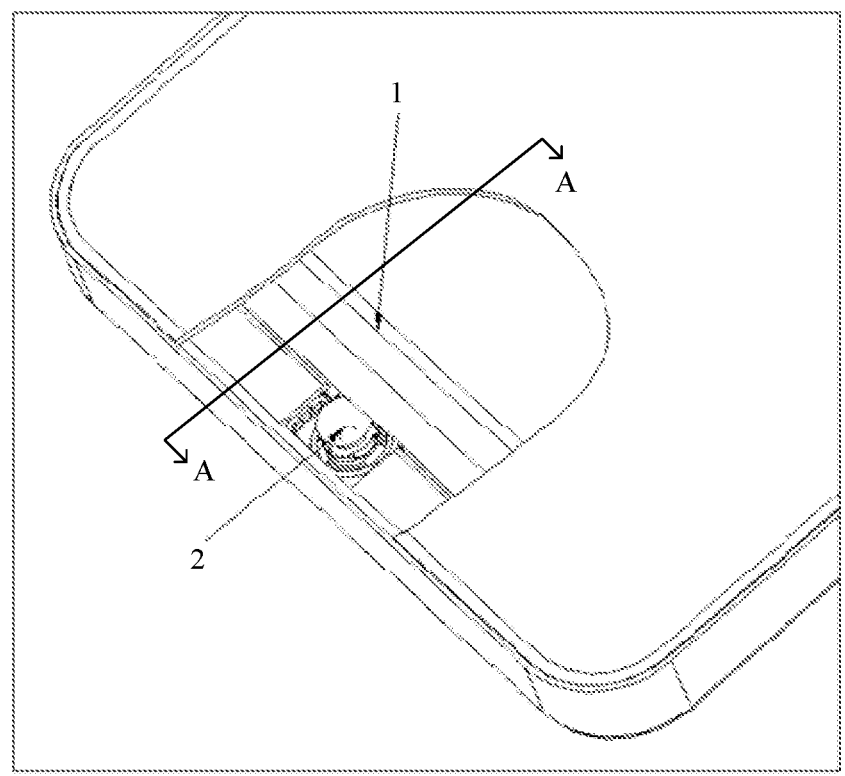
FIG. 5 is a schematic diagram of a control mechanism controlling a second screen to fold according to an embodiment of the present disclosure.
Figure 6:
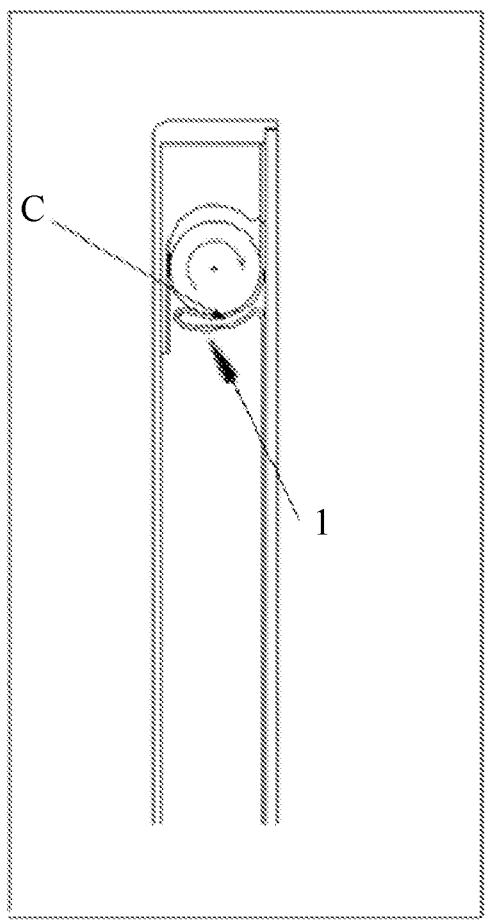
FIG. 6 is a schematic sectional view along AA in FIG. 5.
Figure 7:
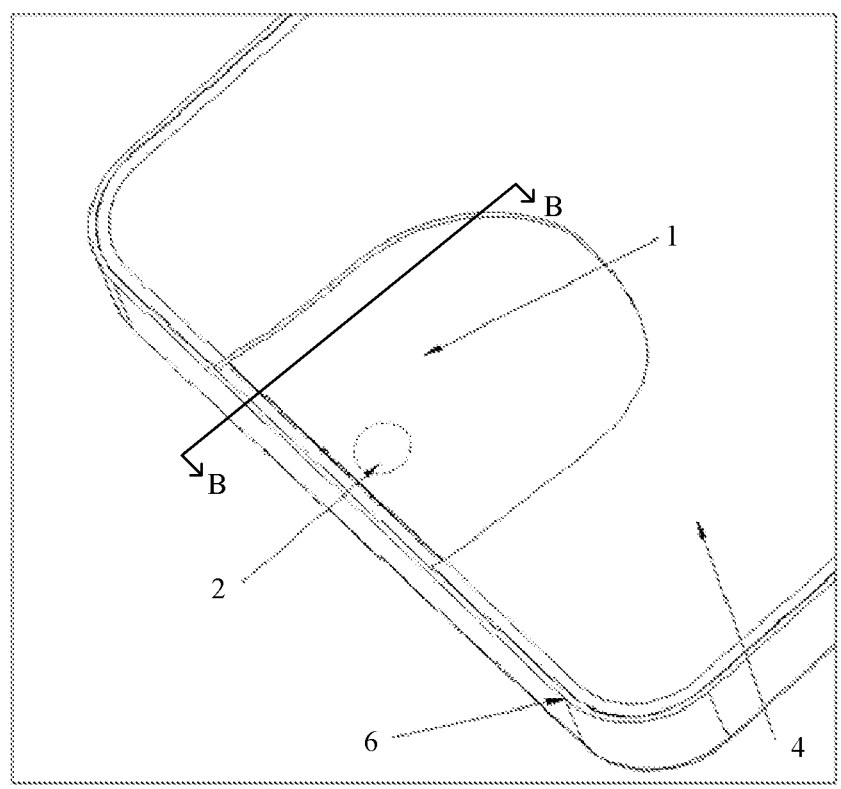
FIG. 7 is a schematic diagram of a control mechanism controlling a second screen to unfold according to an embodiment of the present disclosure.
Figure 8:
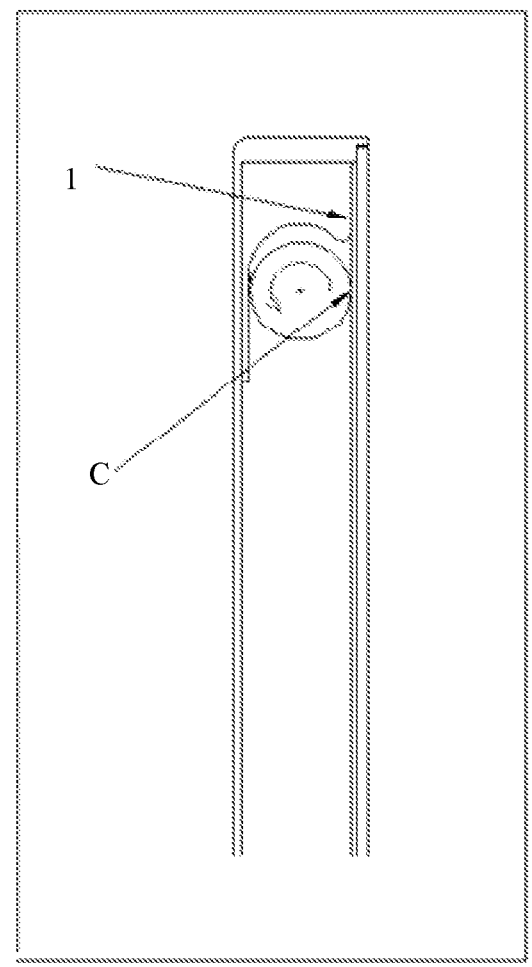
FIG. 8 is a schematic sectional view along BB in FIG. 7.

In this embodiment of the present disclosure, referring to FIG. 5 and FIG. 6, the driving motor 321 energized by a forward current drives the driving gear 322 to rotate in a forward direction, and finally drives the supporting roller 31 under the screen module 1 through the driven gear 323 to move in the first direction. Optionally, the first direction may be clockwise. Because a part of the supporting roller 31, specifically a surface part C, is bonded to the second screen 12 in the screen module 1, when the driven gear 323 rotates in the first direction, the supporting roller 31 rotates to drive a part of the screen module 1, specifically a part or an entirety of the second screen 12, to curl into the electronic device. A viewing angle of the functional module 2, specifically the front-facing camera, is unblocked, and light is received from the transparent cover 4, so that the front-facing camera implements shooting. When the front-facing camera finishes shooting, referring to FIG. 7 and FIG. 8, the driving motor 321 energized by a reverse current can drive the driven gear 323 to rotate in the second direction, and the supporting roller 31 also rotates in the second direction accordingly. Optionally, the second direction may be counterclockwise. Because the second screen 12 in the screen module 1 is bonded to the surface part C of the supporting roller 31, when rotating, the supporting roller 31 drives the screen module 1, specifically the second screen 12 in the screen module 1, to unfold to the functional module 2, that is, directly above the front-facing camera, and extends to the surface of the supporting plate 51 of the roller bracket 5, and the screen module 1 is fully unfolded. In this case, the functional module 2 cannot be seen from above, and the fully unfolded screen module 1 returns to a full screen display state. In this way, normal full screen displaying can be implemented, and the user can browse and view the screen normally.

In other optional specific implementations, the driven gear 323 may be integrally disposed with the supporting roller 31, that is, a gear may be disposed on an outer side wall of the supporting roller 31 as the driven gear 323.

Optionally, the driving motor 321 is disposed below the supporting plate 51.

In this embodiment of the present disclosure, the supporting plate 51 can form a shield for the driving motor 321, to prevent the driving motor 321 from being exposed, which otherwise affects aesthetics.

Optionally, the roller bracket 5 includes two bracket assemblies 52, and the functional module 2 is disposed between the two bracket assemblies 52.

In this embodiment of the present disclosure, by splitting the roller bracket 5 into the two bracket assemblies 52, the functional module 2 can be disposed in a middle position on one side of the electronic device. When the functional module 2 is the front-facing camera, it is convenient for the user to take a picture, and an aesthetic feeling of the appearance design is improved.

Certainly, in other optional specific implementations, the functional module 2 may alternatively be disposed in a corner of the electronic device.

Further optionally, each of the bracket assemblies 52 includes one connecting member 53 and one supporting plate 51, and the connecting member 53 is pivotally connected to one end of the supporting roller 31. Therefore, the supporting roller 31 can rotate relative to the roller bracket 5.

Optionally, the functional module 2 may be disposed between the two supporting plates 51 of the two bracket assemblies 52, to avoid mutual interference between the functional module 2 and the supporting roller 31.

In addition, the driving motor 321 may be disposed under one of the supporting plates 51, on one side away from the other supporting plate 51, or on one side close to the other supporting plate 51.

Figure 9:
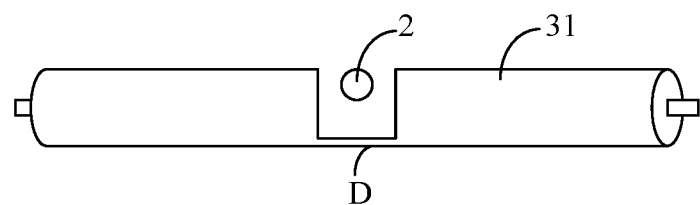
FIG. 9 is a schematic diagram of a relative position relationship between a supporting roller and a functional module when a second screen is in a folded state according to an embodiment of the present disclosure.
Figure 10:
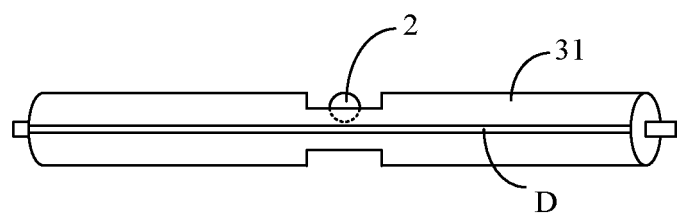
FIG. 10 is a schematic diagram of a relative position relationship between a supporting roller and a functional module when a second screen is in an unfolded state according to an embodiment of the present disclosure.

In other optional specific implementations, the supporting roller 31 is provided with an opening, and a cross section of the opening is U-shaped. Referring to FIG. 9, when the supporting roller 31 drives the second screen 12 to be in the folded state, the opening faces the direction away from the first screen 11, and the functional module 2 is located in the opening and is not blocked. Referring to FIG. 10, when the supporting roller 31 drives the second screen 12 to be in the unfolded state, the opening faces downward, that is, the back of the electronic device, and the functional module 2 is located in the opening and at least partially blocked. An area D of the supporting roller 31 is fixedly connected to the second screen 12.

Optionally, each of the bracket assemblies 52 further includes one baffle, where the baffle and the supporting plate 51 form a stepped structure, and the baffle is located below the supporting roller 31.

Optionally, the supporting roller 31 includes two roller assemblies 311 and one connecting shaft 312, the two roller assemblies 311 are coaxially connected by the connecting shaft 312, and the driven gear 323 is coaxially and fixedly connected to the connecting shaft 312.

In this embodiment of the present disclosure, the driven gear 323 may be disposed between the two roller assemblies 311 of the supporting roller 31. In comparison with disposition on one side of the supporting roller 31, the components can be better laid out. In addition, when the electronic device is dropped, it is not prone to damage.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. A full-screen electronic device, comprising a housing, a screen module, a functional module, and a control mechanism, wherein
the functional module and the control mechanism are located in an accommodating space formed by the housing and the screen module;
the screen module comprises a first screen and a foldable second screen, and the control mechanism is connected to the second screen and drives the second screen to switch between a folded state and an unfolded state; and
in a case that the second screen is in the unfolded state, the second screen blocks the functional module; or in a case that the second screen is in the folded state, the functional module is exposed from the accommodating space;
wherein the control mechanism comprises a supporting roller and a roller driving mechanism, wherein
the supporting roller is fixedly connected to part of the second screen; and
in a case that the roller driving mechanism drives the supporting roller to rotate in a first direction, the supporting roller drives the second screen to move in a direction approaching the first screen, to fold the second screen; or in a case that the roller driving mechanism drives the supporting roller to rotate in a second direction, the supporting roller drives the second screen to move in a direction leaving the first screen, to unfold the second screen;
further comprising a roller bracket, wherein the roller bracket comprises a supporting plate, the supporting plate and the supporting roller are arranged side by side, and when the second screen is in the unfolded state, an edge of the second screen away from the first screen is flat on the supporting plate; an upper surface of the supporting plate is flush with the supporting roller.

2. The full-screen electronic device according to claim 1, further comprising a transparent cover disposed above the screen module.

3. The full-screen electronic device according to claim 1, wherein the roller driving mechanism comprises a driving motor, a driving gear, and a driven gear, wherein
the driving gear is coaxially and fixedly connected to the driving motor;
the driven gear meshes with the driving gear; and
the driven gear is coaxially and fixedly connected to the supporting roller.

4. The full-screen electronic device according to claim 3, wherein the driving motor is disposed below the supporting plate.

5. The full-screen electronic device according to claim 1, wherein the roller bracket comprises two bracket assemblies, and the functional module is disposed between the two bracket assemblies.

6. The full-screen electronic device according to claim 5, wherein each of the bracket assemblies comprises one connecting member and one said supporting plate, and the connecting member is pivotally connected to one end of the supporting roller.

7. The full-screen electronic device according to claim 6, wherein each of the bracket assemblies further comprises one baffle, wherein the baffle and the supporting plate form a stepped structure, and the baffle is located below the supporting roller.

8. The full-screen electronic device according to claim 3, wherein the supporting roller comprises two roller assemblies and one connecting shaft, the two roller assemblies are coaxially connected by the connecting shaft, and the driven gear is coaxially and fixedly connected to the connecting shaft.

* * * * *